(12) United States Patent
Glatter (10) Patent No.: US 8,023,210 B2
(45) Date of Patent: Sep. 20, 2011

(54) OPTICAL ACCESSORY HOLDER

(76) Inventor: Charles Howard Glatter, Bronx, NY (US)

(*) Notice: Subject to any disclaimer, the term of this patent is extended or adjusted under 35 U.S.C. 154(b) by 34 days.

(21) Appl. No.: 12/623,048

(22) Filed: Nov. 20, 2009

(65) Prior Publication Data

US 2010/0128366 A1  May 27, 2010

Related U.S. Application Data

(60) Provisional application No. 61/200,037, filed on Nov. 24, 2008.

(51) Int. Cl.
*G02B 7/02* (2006.01)
(52) U.S. Cl. ........................................ 359/819
(58) Field of Classification Search .................. 359/819, 359/811, 818
See application file for complete search history.

(56) References Cited

U.S. PATENT DOCUMENTS

2008/0310036 A1* 12/2008 Yoshida ........................ 359/819

* cited by examiner

*Primary Examiner* — Alicia M Harrington
(74) *Attorney, Agent, or Firm* — Swanson & Bratschun, LLC (57) ABSTRACT

An optical accessory holder such as an adapter or a focuser drawtube having a passageway through the holder body defining a lengthwise central axis through the passageway. The holder body has an inner surface which includes two substantially linear inner edges parallel to the lengthwise central axis. The inner edges are fixed with respect to the holder body. The holder also includes a clamping member opposite the two inner edges which may be moved with respect to the holder body toward the two inner edges. The holder body may have a partially cylindrical exterior surface. The holder body may also include two substantially linear exterior edges parallel to the lengthwise central axis.

20 Claims, 7 Drawing Sheets

OPTICAL ACCESSORY HOLDER

RELATED APPLICATIONS

This application claims the benefit under 35 USC section 119 of U.S. provisional application 61/200,037 filed on Nov. 24, 2008 and entitled "A Method of Securing Accurate Alignment of Interchangeable Optical Accessories," the content of which is hereby incorporated by reference in its entirety and for all purposes.

TECHNICAL FIELD

The present invention is directed toward an optical accessory holder and more particularly toward a holder and method for removably attaching optical accessories having a cylindrical barrel such as eyepieces, camera or accessory nose pieces and collimation tools to an optical instrument such as a microscope or telescope.

BACKGROUND

As used herein an optical instrument is defined as any type of complex optical device including but not limited to telescopes, microscopes or similar optical devices. Typically, an optical instrument will include multiple optical elements such as mirrors, lenses, or prisms arranged to collect and focus light for observation, analysis or imaging. For example, a telescope may include an objective lens set, an objective mirror, or a combination of objective lens and mirror elements which function primarily to collect and focus light. Similarly, a microscope may include multiple selectable objective lens elements.

Both telescopes and microscopes configured for visual use also include ocular elements, commonly referred to as eyepieces, which are positioned in the optical system at or near the image plane formed by the objective. Alternatively, a camera having a film surface or electronic detector may be placed in the optical system at or near the image plane. In other instances an instrument such as a spectrometer may be positioned at or near the system focal plane. Typically, an optical system is designed so that eyepieces, cameras, imagers or other tools which in use are positioned at or near the image plane may be removed or interchanged as needed. For example, a telescope may be designed to interchangeably receive and hold various eyepieces having different selected focal lengths so that a user of the telescope may readily select an appropriate magnification and field of view for viewing an optical image. Similarly, optical instruments such as telescopes are typically configured to selectively receive either an eyepiece or an imaging device depending upon whether the user wants to record an image or directly view through the instrument. Furthermore, many important tasks such as the collimation of the optical elements in a complex optical instrument may be best performed with various tools which are received and held in the optical instrument at or near the eyepiece/image plane position.

Accordingly, telescopes, microscopes and similar optical instruments typically include an opening and clamping mechanism away from the objective, which opening is appropriately sized to receive and support the types of accessories which will typically be used with the selected optical instrument. For example, many telescopes and microscopes have an opening and associated clamping mechanism associated with a focusing mechanism that can receive selected eyepieces, the nose pieces of cameras, collimation tools or similar accessories. All of these accessories typically have a cylindrical barrel which is clamped into a corresponding cylindrical opening with a set screw or similar device.

The proper operation of an optical instrument requires that the various optical elements of the system be properly aligned with respect to an optical axis. For example, the proper operation of a telescope requires that the optical axis of the various lens elements within an eyepiece be aligned with the overall optical axis of the objective. Misalignment between these axes will introduce aberrations into the image viewed through the eyepiece. Similarly, the film plane or plane of an electronic image detector associated with a camera attached to a telescope must be normal to the optical axis of the telescope objective to avoid aberrations in the recorded image. Accordingly, it is desirable that an eyepiece holder support an eyepiece or other accessory such that the optical axis of the eyepiece or other accessory is both parallel to the main optical axis of the instrument and concentric with the main optical axis of the instrument.

As mentioned above, an eyepiece or accessory holder is typically sized to receive eyepieces or accessories having a standard barrel diameter. For example, most modern telescope eyepieces have a diameter of either 1¼ inches or 2 inches. Accordingly, the nose pieces for cameras or the barrels of other accessories such as collimation devices are also prepared to have either a 1¼ inch or 2 inch diameter. Many telescopes have an eyepiece holder which is slightly greater than 2 inches in diameter. By optionally using an adapter with a 2 inch outer diameter and a 1¼ inch opening, the 2 inch holder of the instrument may be utilized with both 1¼ or 2 inch diameter accessories and eyepieces.

Figure 1:
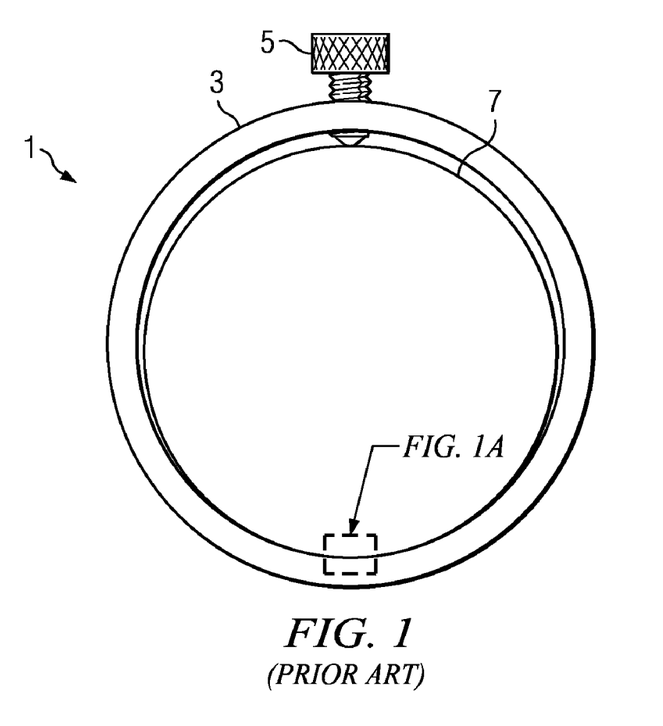
FIG. 1 is a plan view of a prior art optical accessory holder.
Figure 1A:
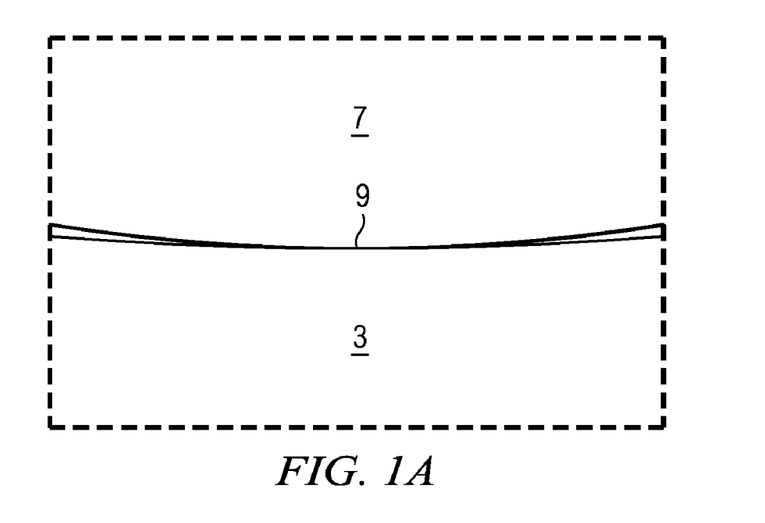

Most known holders or adapters feature a slightly oversized cylindrical opening into which the cylindrical barrel of an eyepiece or accessory is placed. The eyepiece may then be clamped with a set screw, multiple set screws, a collet or a combination of set screws and compression bands. The foregoing clamping strategies typically rely in part upon contact between the cylindrical exterior surface of the accessory and a cylindrical interior surface of the holder, a telescope drawtube for example. As shown in FIG. 1, a prior art holder 1 having a cylindrical drawtube 3 and a clamping mechanism such as set screw 5 allows significant misalignment between the accessory 7 and the primary optical axis. The source of much misalignment is the contact point 9 between the accessory barrel and the inner cylindrical surface of the drawtube 3. Misalignment can be reduced by precise machining of the corresponding surfaces; however this is not practical as very close tolerances will result in some accessories jamming in the drawtube opening. Also, the precision of the sizing of an accessory barrel is outside of the control of an instrument manufacturer.

There are two components to the potential misalignment. First, there may be lateral displacement of the axis of the accessory with respect to the primary optical axis. Lateral displacement does not destroy the parallel relationship between these two axes but does result in the primary and accessory axis no longer being concentric. In addition, the axis of the optical accessory may be tipped or skewed with respect to the primary optical axis, such that the parallel relationship of these axes is lost. In many applications moderate lateral misalignment can be tolerated, but even small amounts of tipping or skew will negatively affect optical performance. In other applications, such as imaging, or the precise collimation of instrument optics using collimation tools even relatively small levels of lateral misalignment or skew may be problematic.

The embodiments disclosed herein are directed to overcoming one or more of the problems detailed above.

SUMMARY OF THE EMBODIMENTS

One embodiment includes an optical accessory holder. The holder has a holder body defining a passageway through the holder body. The passageway surrounds a lengthwise central axis through the passageway. The holder body has an inner surface which includes two substantially linear inner edges parallel to the lengthwise central axis. The inner edges are fixed with respect to the holder body. The holder also includes a clamping member opposite the two inner edges which may be moved with respect to the holder body toward the two inner edges.

The two inner edges may be formed by a recess in the holder body. In this embodiment the lengthwise junction between the recessed and non-recessed portion of the holder body will define the two inner edges. Alternatively, the inner edges may be defined by two extensions from the inner surface of the holder body extending inward and defining the edges.

In selected embodiments the position of a point on each of the two inner edges and a point on the clamping member will define an isosceles triangle in a plane normal to the lengthwise central axis. In an alternative embodiment the position of a point on each of the two inner edges and a point on the clamping member will define an equilateral triangle in a plane normal to the lengthwise central axis.

The optical accessory holder may be implemented where a point on each inner edge which is nearest the lengthwise central axis is about 5/8 inch from the lengthwise central axis in a plane normal to the lengthwise central axis. Alternatively, the holder may be implemented where a point on each inner edge which is nearest the lengthwise central axis is about 1 inch from the lengthwise central axis in a plane normal to the lengthwise central axis.

The clamping member of the embodiments described above may be a screw threaded through the holder body having a head outside of the holder body and a clamping tip extending through the inner surface of the holder body. Alternatively, the clamping member may include a tapered wedge operatively mated with a tapered slot such that the movement of the tapered wedge parallel to the lengthwise axis causes a distance between the inner edges and a clamp surface to decrease.

The accessory holder may include a holder body having a partially cylindrical exterior surface. The holder body may include two substantially linear exterior edges parallel to the lengthwise central axis. The exterior edges will be fixed with respect to the holder body. In selected embodiments, a point on each exterior edge furthest from the lengthwise central axis may be about 1 inch from the lengthwise central axis in a plane normal to the lengthwise central axis.

Embodiments of the optical accessory holder may be implemented as a separate adapter which may be selectively received in or attached to an optical instrument. Alternatively, embodiments may be implemented as part of an optical instrument, for example, as part of the drawtube associated with the focusing mechanism of an optical instrument.

Alternative embodiments include a method of holding an optical accessory having a substantially cylindrical barrel. The method includes providing an optical accessory holder as described above and clamping the barrel of an optical accessory into the holder. In use the barrel of the accessory will be placed in a passageway through the holder body and clamped against two lengthwise inner edges by the movement of a clamped member toward the inner edges. The method may further include clamping the holder to or in an optical instrument. In this embodiment of the method the holder may include a partially cylindrical exterior surface and two substantially linear exterior edges parallel to the lengthwise central axis. In use, the exterior edges will be clamped against a surface of the optical instrument by movement of a clamping mechanism associated with the optical instrument toward the exterior edges.

DETAILED DESCRIPTION

Unless otherwise indicated, all numbers expressing quantities of ingredients, dimensions, reaction conditions and so forth used in the specification and claims are to be understood as being modified in all instances by the term "about".

In this application and the claims, the use of the singular includes the plural unless specifically stated otherwise. In addition, use of "or" means "and/or" unless stated otherwise. Moreover, the use of the term "including", as well as other forms, such as "includes" and "included", is not limiting. Also, terms such as "element" or "component" encompass both elements and components comprising one unit and elements and components that comprise more than one unit unless specifically stated otherwise.

Figure 2:
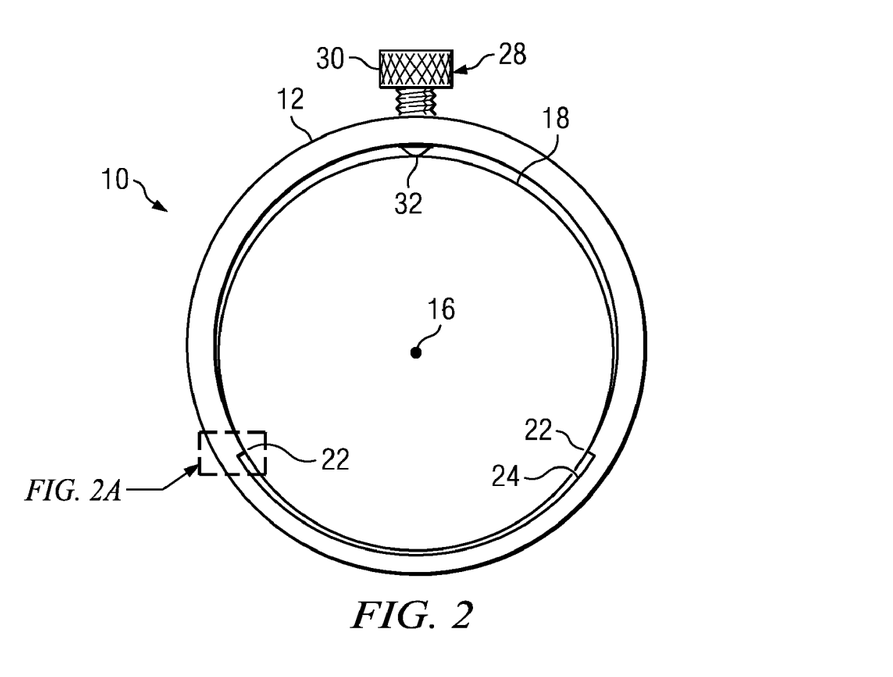
FIG. 2 is a plan view of an optical accessory holder consistent with disclosed embodiments.
Figure 2A:
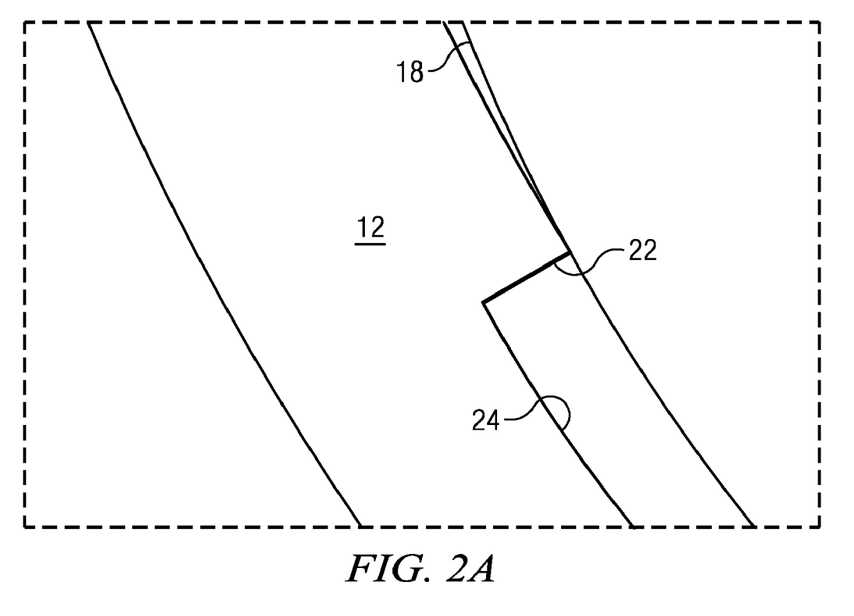
Figure 3:
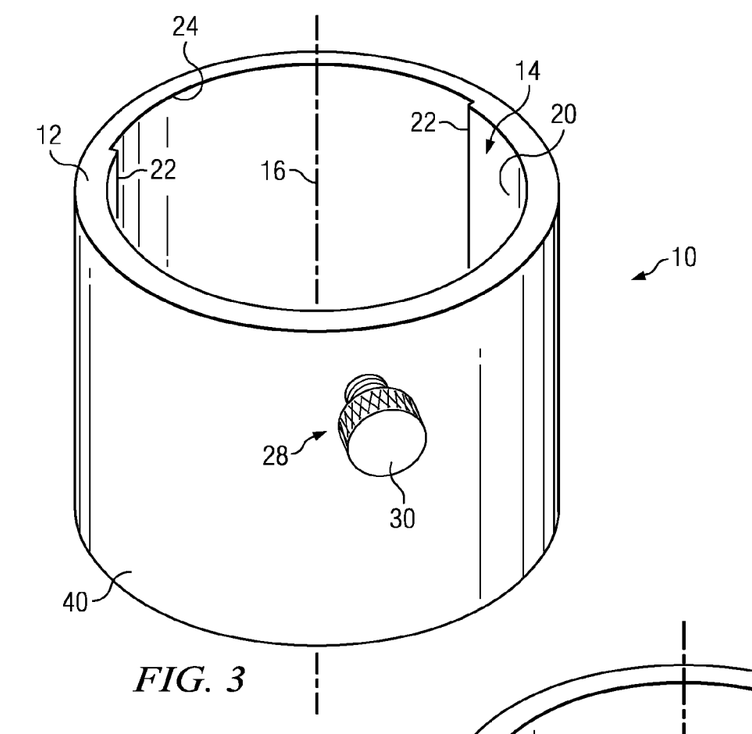
FIG. 3 is a perspective view of the optical accessory holder of FIG. 2.

One embodiment is an optical accessory holder 10, as shown in FIG. 2 and FIG. 3. The optical accessory holder 10 is could be implemented as a separate adapter or the optical accessory holder 10 could be implemented as an integrated portion of an optical apparatus. For example, the accessory holder 10 could be permanently integrated with a telescope draw tube or focusing mechanism. Whether implemented as a separate adaptor or as part of another mechanism, the optical accessory holder 10 will include a holder body 12, which defines a lengthwise passageway 14 through the holder body 12.

The lengthwise passageway 14 will be somewhat cylindrical in shape and sized to receive optical accessories having a cylindrical barrel. The optical accessories may include but are not limited to eyepieces, accessory nose pieces, analytical instruments or collimation tools which may be mounted by clamping a cylindrical barrel. Nose pieces sized to fit into the optical accessory holder 10 may be attached to any type of accessory device including but not limited to film cameras, digital cameras, specialized imaging devices, video cameras, web cams, spectroscopic analysis apparatus, gratings, collimation tools or other analytical or optical accessories.

The lengthwise passageway 14 surrounds a lengthwise central axis 16 as shown on FIGS. 2 and 3. As is described in detail below, the lengthwise central axis 16 is defined as being parallel to and concentric with the optical axis of any cylindrical accessory placed in the optical accessory holder 10.

For example, a representative optical accessory is an eyepiece having a cylindrical barrel. In FIG. 2, an accessory is represented in plan view by the barrel 18 received in the passageway 14 through the body 12 of the optical accessory holder 10. It may be noted that in the plan view of FIG. 2 the lengthwise central axis 16 extends normal to the plane defined by the page. In addition, the lengthwise central axis 16 is parallel to and concentric with the optical axis of the eyepiece barrel 18. The lengthwise central axis 16 may, but does not need to be, concentric with the body 12 of the optical accessory holder 10. The lengthwise central axis 16 will also, when an optical instrument is properly collimated, be substantially parallel to and concentric with the optical axis of the primary optical instrument.

Figure 4:
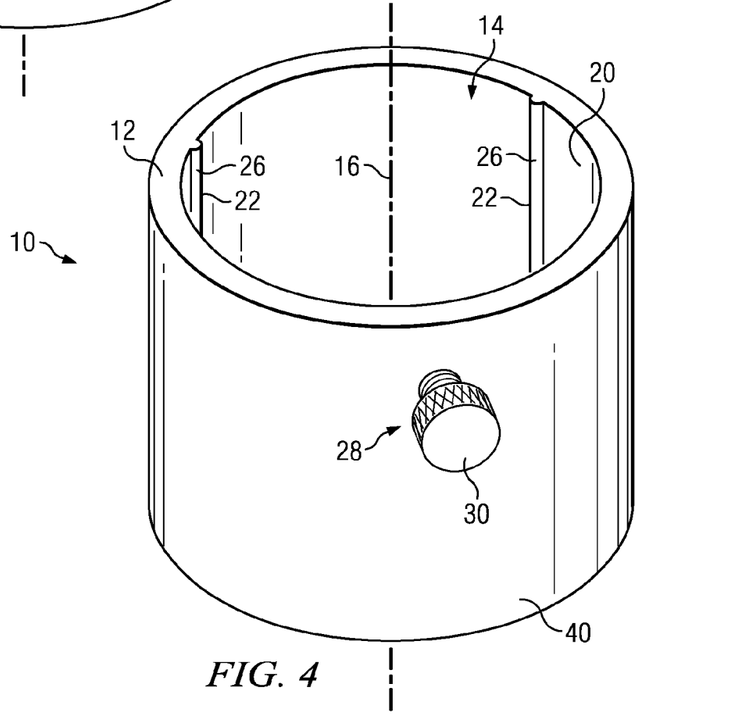
FIG. 4 is a perspective view of an optical accessory holder featuring alternative lengthwise inner edges.

As also shown on FIGS. 2 and 3, the holder body 12 will have an inner surface 20. As shown on FIGS. 3 and 4, the inner surface 20 includes two substantially linear inner edges 22. The inner edges 22 run parallel to the lengthwise central axis 16. In addition, the inner edges 22 are fixed with respect to the holder body. As shown in FIG. 3, the inner edges 22 may be defined by a recess 24 formed in the holder body such that the lengthwise junctions between the recessed and non-recessed portions of the holder body 12 create the two substantially linear inner edges 22. Alternatively, as shown in FIG. 4, the holder body may in large part be a substantially cylindrical surface with two extensions 26 from the substantially cylindrical surface extending inward and defining the two inner edges 22.

In any embodiment, the structure which defines inner edges 22 may be formed by any known fabrication method. For example, in embodiments such as that shown in FIG. 3 which feature a recess 24, material can be removed from the body 12 to form the recess by milling, broaching, chemical etching or by other processes. Alternatively, the recess 24 could be formed without material removal by molding, cold forming, forging or similar techniques. In an embodiment such as shown in FIG. 4, the extensions 26 can be formed as described above from the native material of the body 12. Alternatively, rails could be mounted to the body 12 provided supplemental rails are fixed and immovable with respect to the holder body 12.

The optical accessory holder 10 also includes a clamping member 28 substantially opposite the two inner edges 22. A portion of the clamping member 28 must be movable with respect to the holder body, and thus movable with respect to the two inner edges 22. As described in detail below and shown on FIGS. 2-4, the clamping member may be implemented with a thumb screw in threaded engagement through the holder body 12 having a head 30 operatively positioned to the exterior of the body 12 and a clamping tip 32 extending through the inner surface 20 of the holder body. The clamping tip 32 may be moved toward or away from the inner edges 22 by rotating the thumb screw, thus applying or releasing clamping force.

The combination of the two inner edges 22 and opposing clamping member 28 define a secure and stationary seat for a cylindrical optical accessory. The inner edges are linear and have a length with is parallel to the lengthwise central axis 16. Accordingly, the cylindrical barrel of the optical accessory which is pressed against the length of each inner edge 22 by the clamping member 28 is substantially prohibited from tipping or skew misalignment. In addition, the inner edges 22 are fixed and immovable with respect to the body 12 and the size and shape of the inner edges 22 may be fabricated to assure that the optical axis of an accessory having a known barrel diameter can be placed coincident with the lengthwise central axis 16 without any substantial lateral misalignment.

Although the inner edges 22 have a length which is parallel to the lengthwise central axis 16, it is convenient to describe the orientation of these structures with respect to the points on a plane which is normal to the lengthwise central axis. For example, the plane of the page of FIG. 2 is normal to the lengthwise central axis 16. It may be observed from FIG. 2 that points on each inner edge 22 and on the clamping member 28, lie within a single plane normal to the lengthwise central axis 16 and define the corners of a triangle. The clamping force applied by the clamping member 28 against each inner edge 22 will be balanced if the three points described above form an isosceles triangle in a plane normal to the lengthwise central axis. Alternatively, the two inner edges and clamping member may be located such that these elements define the points of an equilateral triangle in a plane normal to the lengthwise central axis. This configuration, which is shown in FIG. 2 requires that the angle between any two of the edge and clamping members measured from the lengthwise central axis be 120 degrees. The equilateral configuration results in maximum stability.

Typical modern optical accessories have a barrel diameter of either 1¼ inch or 2 inches. Accordingly, the proper lateral position of the optical axis of an accessory having a 1¼ barrel size can be assured by fabricating the optical accessory holder 10 to have a body 12 where a point on the inner edges 22, which is nearest the lengthwise central axis 16, is about ⅝ inch from the lengthwise central axis measured in a plane normal to the lengthwise central axis. Similarly, for 2 inch diameter accessories, the proper positioning of the optical axis of the accessory may be assured by providing that a point on each inner edge 22 which is nearest the lengthwise central axis 16 is about 1 inch from the lengthwise central axis in a plane normal to the lengthwise central axis. Although a single point on each inner edge 22 serves to prevent lateral misalignment, it should be noted that the inner edges 22 are linear structures having a length and lengthwise bearing surface parallel to the lengthwise central axis 16 which prevents tip or skew misalignment.

Figure 5:
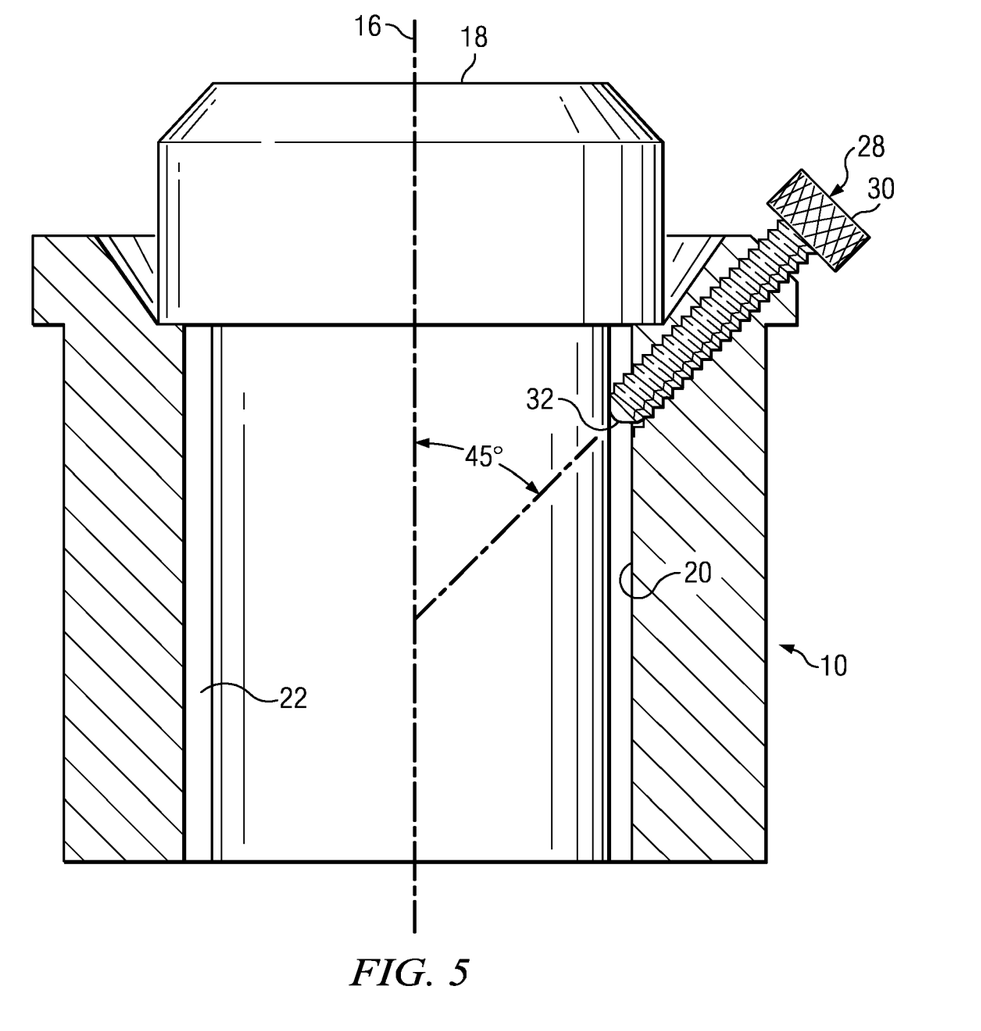
FIG. 5 is a front elevation view of an optical accessory holder in cross-section, showing an eyepiece received therein.

As detailed above, the clamping member 28 may be implemented with a thumb screw in threaded engagement through the holder body 12 having a head 30 outside of the holder body and a clamping tip 32 extending through the inner surface 20 of the holder body. The screw may extend through the holder body 12 perpendicular to the lengthwise central axis 16. Alternatively, the screw may have a screw axis which is displaced at a selected angle other than 90 degrees from the lengthwise central axis 16. For example, as shown in FIG. 5 the screw 28 may have a screw axis which defines an angle of about 45 degrees with the lengthwise central axis 16.

Figure 6:
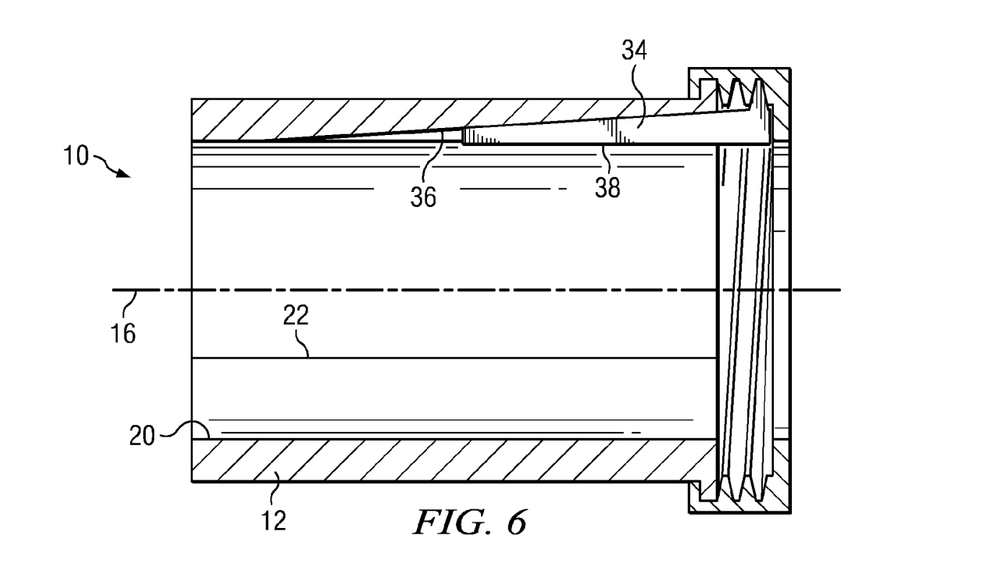
FIG. 6 is a front elevation view of an optical accessory holder in cross-section showing an alternative clamping member.

Alternative structures may be used to implement the clamping member element. For example, the clamping member may be implemented as shown on FIG. 6 with a tapered wedge 34 operatively mated with a tapered slot 36 associated with the inner surface 20 of the holder body 12. Thus, movement of the tapered wedge parallel to the lengthwise axis may cause a distance between the inner edges 22 and a clamp surface 38 on the tapered wedge 34 to decrease. The use of a tapered wedge having a linear clamp surface 38 which is parallel to the lengthwise central axis 16 results in the application of clamping force to an accessory barrel along a line parallel to the lengthwise central axis thus further preventing tip or skew misalignment.

As described above, the optical accessory holder may be implemented as a separate adapter or as a substantially permanent structure incorporated into the optical instrument, for example the embodiments could be directly fabricated as a modified focuser draw tube. Certain advantages may be appreciated in an embodiment which is implemented as a removable adapter. In an adapter embodiment, the optical accessory holder 10 may also have a partially or wholly cylindrical exterior surface 40 as shown on FIGS. 3 and 4. In particular, an optical accessory holder 10 may be implemented as a removable adapter having a cylindrical exterior surface 40 of approximately 2 inches in diameter, allowing the adapter to be secured in a conventional 2 inch focuser or drawtube. Unfortunately, the problem of lateral displacement and tip or skew misalignment which can be substantially eliminated between the adapter and a 1¼ inch accessory received therein will still be present between the 2 inch drawtube and exterior surface 40 of the optical accessory holder 10 if the exterior surface 40 is implemented a simple cylindrical surface.

Figure 7:
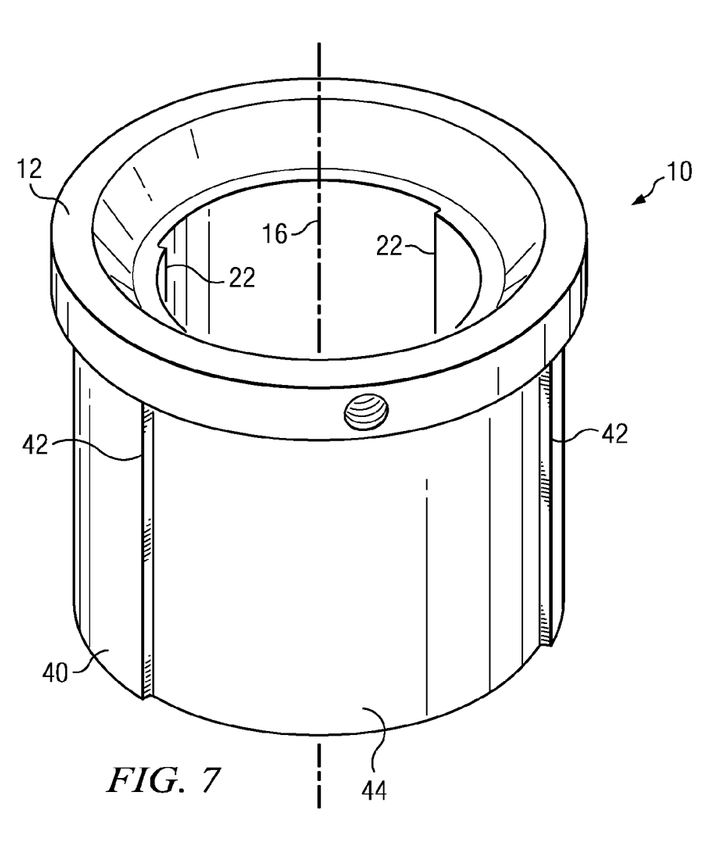
FIG. 7 is a perspective view of an optical accessory holder implemented as a separate adapter.
Figure 8:
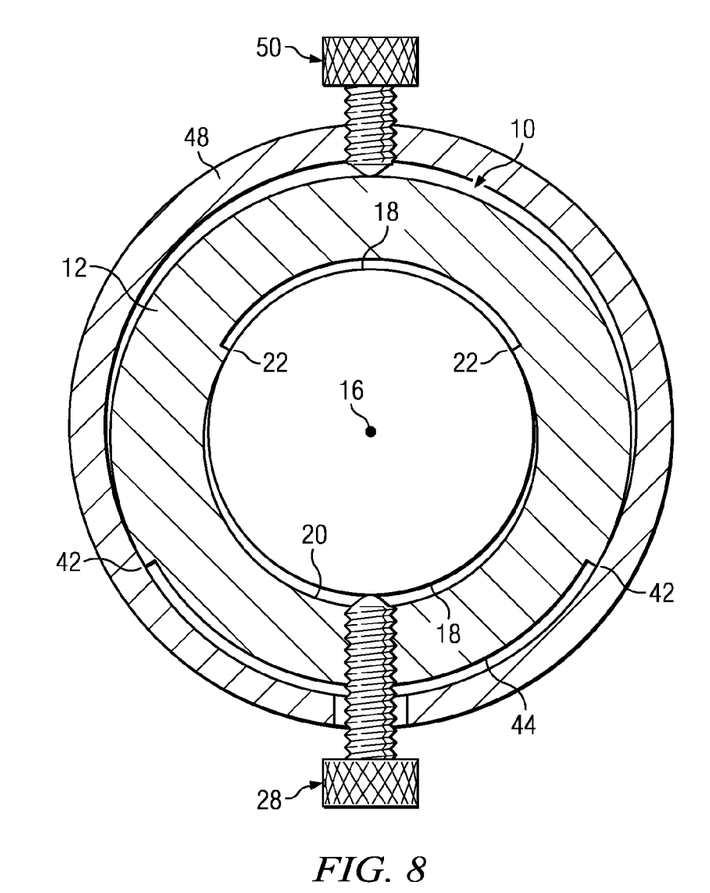
FIG. 8 is a plan view of the adapter of FIG. 7 in partial cross-section.

Lateral misalignment and tip or skew misalignment may be minimized between the instrument drawtube or other holder and the adapter by including structures similar to those described above on or with the exterior surface 40 of the optical accessory holder 10. In particular, as shown in FIGS. 7 and 8, the optical accessory holder 10 may have an exterior surface 40 which includes two substantially linear exterior edges 42 which are parallel to the lengthwise central axis 16 and which are fixed and immovable with respect to the holder body 12. As shown on FIGS. 7-10 the exterior edges 42 may be defined by a recess 44 formed in the exterior surface 40 such that the lengthwise junction between the recessed and non-recessed portions of the holder body define the length of the two exterior edges 42. Alternatively, as shown in FIGS. 9 and 10 the exterior edges 42 may be formed as two extensions 46 from the substantially cylindrical exterior surface 40 and extending outward to define the two exterior edges 42.

Figure 9:
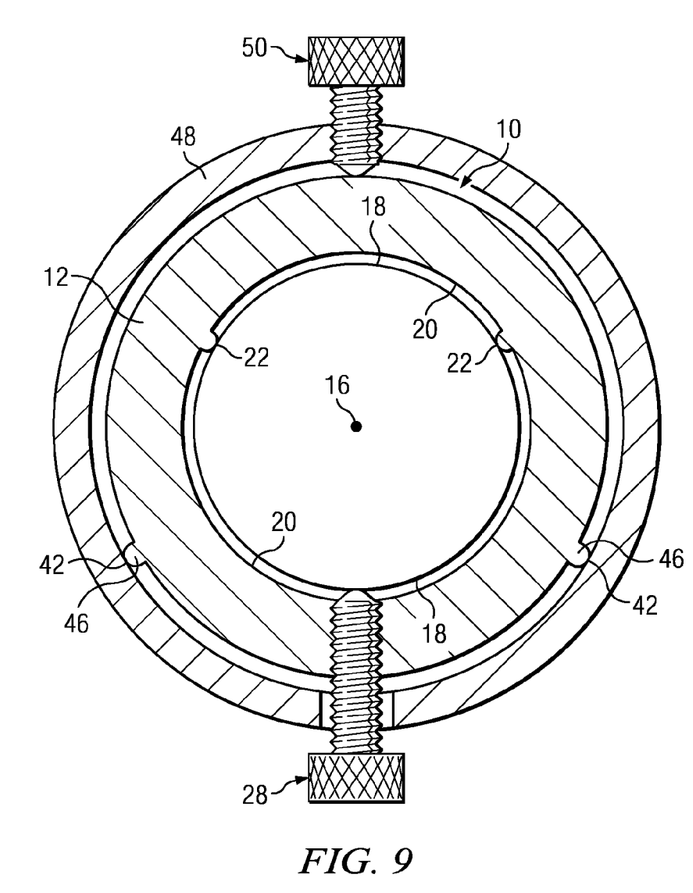
FIG. 9 is a plan view of an alternative adapter embodiment in partial cross-section.
Figure 10:
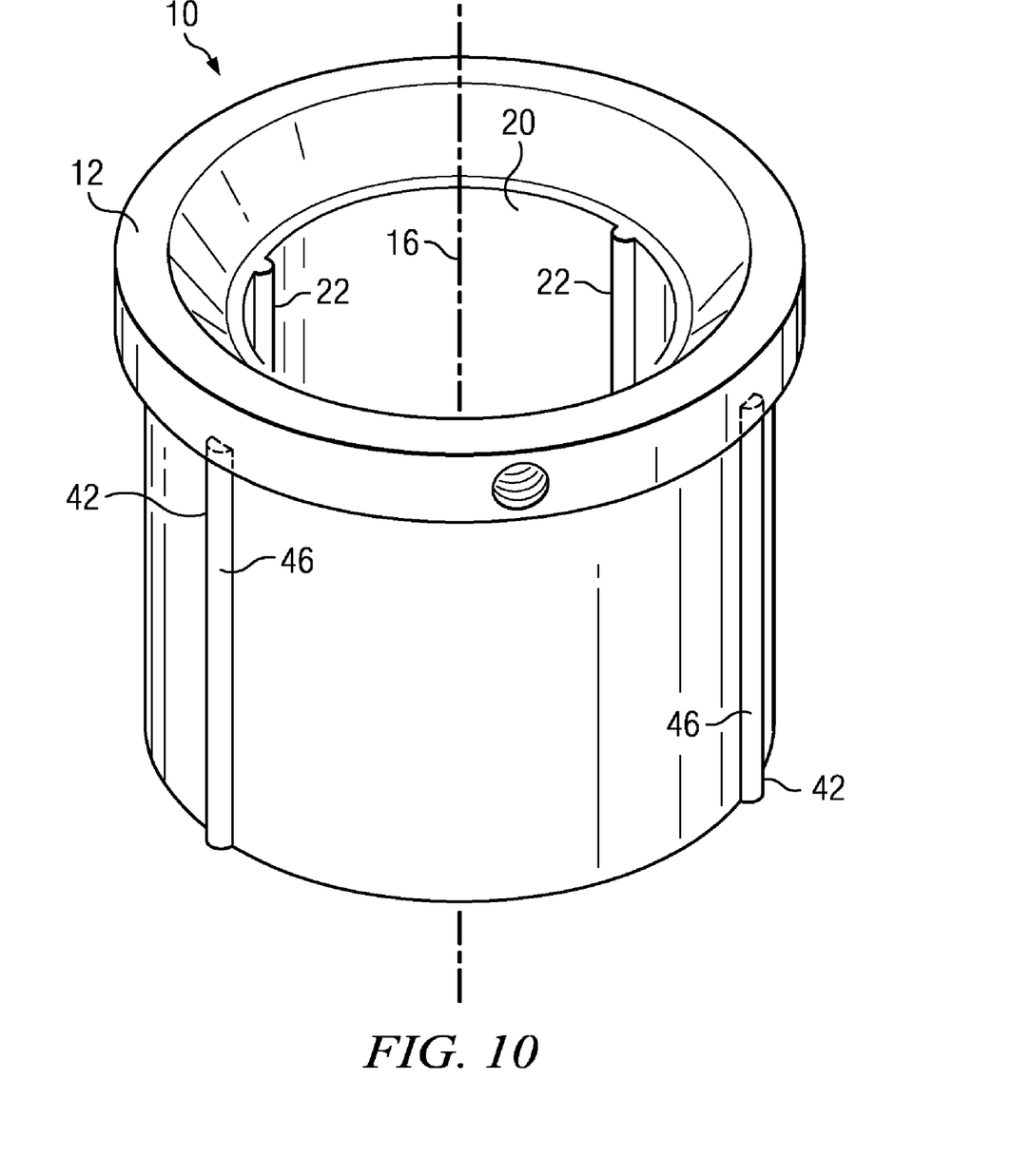
FIG. 10 is a perspective view of the adapter of FIG. 9.

As illustrated in FIGS. 8 and 9, the apparatus described herein can be used to assure that the optical axis of any accessory is secured to an optical instrument with minimal lateral offset from the desired position and minimal tip and skew misalignment. For example, as shown in FIGS. 8 and 9, an optical instrument will typically include a holder such as drawtube 48. The drawtube 48 will typically have a diameter slightly larger than 2 inches. A separate optical accessory holder 10 configured as a removable adapter having a body 12 may be placed into the drawtube 48. The body 12 may include two exterior edges 42 which have a length parallel to the lengthwise central axis 16 and which will securely seat against the inner cylindrical surface of the drawtube 48 when clamping pressure is applied, for example, by a drawtube set screw 50 threaded through the drawtube. The distance between a point on an exterior edge 42 and the lengthwise central axis 16 in a plane normal to the lengthwise central axis may be selected to be about 1 inch to insure that the optical axis of any accessory placed in the adapter is concentric with the lengthwise central axis and thus the optical axis of the optical instrument.

As also shown in FIGS. 8 and 9 the interior surface 20 of the optical accessory holder 10 may include inner edges 22 as described in detail above and a clamping member, shown as a thumb screw 28, which together cooperate to secure a 1¼ inch diameter accessory 18 with both minimal lateral displacement and minimal tip and skew misalignment. Thus, a single optical accessory holder 10 implement as an adapter may be used to secure 1¼ inch accessories into a conventional 2 inch or other larger sized instrument holder with minimal misalignment.

An alternative embodiment is a method of holding an optical accessory having a substantial cylindrical barrel. The disclosed method minimizes both the potential lateral displacement and skew of the optical axis of the accessory from the primary optical axis of the optical instrument. The method includes providing an optical accessory holder as described above. The optical accessory holder may be implemented as an integrated part of an existing structure for example, a telescope focuser drawtube. Alternatively, the optical accessory holder may be implemented as a separate adapter. In use, the barrel of an optical accessory may be placed into a passageway or opening through the optical accessory holder. A clamping member associated with the optical accessory holder may then be moved toward two inner edges associated with in an inner surface of the accessory holder thus clamping the barrel of the optical accessory between the clamping member and the two inner edges. The inner edges have a length which is parallel to the desired optical axis. Thus the barrel of the optical accessory is supported along its length parallel to the primary optical axis and at three points in a plane normal to the optical axis. Accordingly lateral misalignment and tip or skew misalignments of the accessory are minimized.

Various embodiments of the disclosure could also include permutations of the various elements recited in the claims as if each dependent claim was a multiple dependent claim incorporating the limitations of each of the preceding dependent claims as well as the independent claims. Such permutations are expressly within the scope of this disclosure.

While the invention has been particularly shown and described with reference to a number of embodiments, it would be understood by those skilled in the art that changes in the form and details may be made to the various embodiments disclosed herein without departing from the spirit and scope of the invention and that the various embodiments disclosed herein are not intended to act as limitations on the scope of the claims. All references cited herein are incorporated in their entirety by reference.

What is claimed is:

1. An optical accessory holder comprising:
    a holder body defining a passageway through the holder body, the passageway surrounding a lengthwise central axis through the passageway;
    an inner surface of the holder body, the inner surface comprising two substantially linear inner edges parallel to the lengthwise central axis which inner edges are fixed with respect to the holder body; and
    a clamping member opposite the two inner edges which may be moved with respect to the holder body toward the two inner edges.

2. The optical accessory holder of claim 1 wherein the inner surface of the holder body comprises a recess formed in the holder body, and wherein lengthwise junctions between the recessed and the non-recessed portions of the holder body define the two inner edges.

3. The optical accessory holder of claim 1 wherein the inner surface of the holder body comprises a substantially cylindrical surface and two extensions from the substantially cylindrical surface, extending inward and defining the two inner edges.

4. The optical accessory holder of claim 1 wherein the position of a point on the two inner edges and a point on the clamping member define an isosceles triangle in a plane normal to the lengthwise central axis.

5. The optical accessory holder of claim 4 wherein the position of the point on the two inner edges and the point on the clamping member define an equilateral triangle in a plane normal to the lengthwise central axis.

6. The optical accessory holder of claim 1 wherein a point on each inner edge which is nearest the lengthwise central axis is about 5/8 inch distant from the lengthwise central axis in a plane normal to the lengthwise central axis.

7. The optical accessory holder of claim 1 wherein a point on each inner edge which is nearest the lengthwise central axis is about 1 inch distant from the lengthwise central axis in a plane normal to the lengthwise central axis.

8. The optical accessory holder of claim 1 wherein the clamping member comprises a screw through the holder body having a head outside of the holder body and a clamping tip extending through the inner surface of the holder body.

9. The optical accessory holder of claim 8 wherein a screw axis of the screw defines an angle of less than 90° with the lengthwise central axis.

10. The optical accessory holder of claim 9 wherein the screw axis of the screw defines an angle of about 45° with the lengthwise central axis.

11. The optical accessory holder of claim 1 wherein the clamping member comprises a tapered wedge operatively mated with a tapered slot associated with the inner surface of the holder body such that movement of the tapered wedge parallel to the lengthwise axis causes a distance between the inner edges and a clamp surface of the tapered wedge to decrease.

12. The optical accessory holder of claim 1 wherein the holder body comprises a partially cylindrical exterior surface.

13. The optical accessory holder of claim 12 further comprising two substantially linear exterior edges parallel to the lengthwise central axis which exterior edges are fixed with respect to the holder body.

14. The optical accessory holder of claim 13 wherein a point on each exterior edge which is furthest the lengthwise central axis is about 1 inch distant from the lengthwise central axis in a plane normal to the lengthwise central axis.

15. The optical accessory holder of claim 13 wherein the cylindrical exterior surface comprises a recess formed in the holder body, and wherein the lengthwise junctions between the recessed and the non-recessed portions of the holder body defines the two exterior edges.

16. The optical accessory holder of claim 12 wherein the cylindrical exterior surface comprises two extensions from the substantially cylindrical exterior surface, extending outward and defining the two exterior edges.

17. An optical accessory holder comprising:
    a holder body defining a passageway through the holder body, the passageway surrounding a lengthwise central axis through the passageway;
    an inner surface of the holder body, wherein the inner surface of the holder body comprises a recess formed in the holder body and wherein lengthwise junctions between the recessed and the non-recessed portions of the inner surface of the holder body define two substantially linear inner edges parallel to the lengthwise central axis which inner edges are fixed with respect to the holder body;
    a partially cylindrical exterior surface comprising a recess formed in the holder body, wherein lengthwise junctions between the recessed and the non-recessed portions of the exterior surface of the holder body defines two substantially linear exterior edges parallel to the lengthwise central axis which exterior edges are fixed with respect to the holder body; and
    a clamping member opposite the two inner edges which may be moved with respect to the holder body toward the two inner edges.

18. A method of holding an optical accessory having a substantially cylindrical barrel comprising:
    providing an optical accessory holder comprising:
        a holder body defining a passageway through the holder body, the passageway surrounding a lengthwise central axis through the passageway;
        an inner surface of the holder body, the inner surface comprising two substantially linear inner edges parallel to the lengthwise central axis which inner edges are fixed with respect to the holder body; and
        a clamping member opposite the two inner edges which may be moved with respect to the holder body toward the two inner edges;
    placing the barrel of the optical accessory into the passageway; and
    moving the clamping member toward the two inner edges thus clamping the barrel of the optical accessory between the clamping member and the two inner edges and supporting the barrel at three points in a plane normal to the lengthwise central axis which points correspond to the clamping member and each inner edge.

19. The method of holding an optical accessory holder of claim 18 where in the optical accessory holder further comprises a partially cylindrical exterior surface and two substantially linear exterior edges parallel to the lengthwise central axis which exterior edges are fixed with respect to the holder body, the method further comprising:
    placing the optical accessory holder in an associated with an optical instrument; and
    clamping the optical accessory holder against a surface of the opening.

20. The method of holding an optical accessory holder of claim 19 wherein clamping pressure is applied against the exterior surface from a direction substantially opposite the two substantially linear exterior edges.

* * * * *